(12) United States Patent
Ying et al.

(10) Patent No.: US 8,699,164 B1
(45) Date of Patent: Apr. 15, 2014

(54) DATA RECOVERY USING NO SYNC MARK RETRY

(71) Applicant: LSI Corporation, Milpitas, CA (US)

(72) Inventors: Chu N. Ying, Los Altos, CA (US); Lei Chen, Sunnyvale, CA (US); Herjen Wang, Sunnyvale, CA (US); Johnson Yen, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/650,601

(22) Filed: Oct. 12, 2012

(51) Int. Cl.
*G11B 5/09* (2006.01)

(52) U.S. Cl.
USPC .................. 360/51; 360/42; 360/55; 360/70

(58) Field of Classification Search
None
See application file for complete search history.

(56) References Cited

U.S. PATENT DOCUMENTS

| 6,009,549 A * | 12/1999 | Bliss et al. ............... 360/51 |
| 2011/0051576 A1* | 3/2011 | Ashizawa et al. ......... 369/47.14 |
| 2012/0063024 A1* | 3/2012 | Mathew et al. ............ 360/55 |

* cited by examiner

*Primary Examiner* — Muhammad N Edun
(74) *Attorney, Agent, or Firm* — Advent, LLP (57) ABSTRACT

A read channel is configured to receive at least part of a data fragment read from a storage media into a register, wherein the data fragment is configured to be formatted with a preamble, a sync mark (e.g., a syncMark), and user data, and wherein the data fragment is missing a sync mark. A position in the data fragment is selected, a sync mark is assumed at the selected position. The data is then processed assuming the sync mark is at the selected position of the data fragment to determine whether the data converges. When a determination is made that the data converges, the data is recovered.

20 Claims, 5 Drawing Sheets

DATA RECOVERY USING NO SYNC MARK RETRY

BACKGROUND

Various data processing systems have been developed including storage systems, cellular telephone systems, and radio transmission systems. In such systems, data is transferred from a sender to a receiver via a storage media. For example, in a storage system, data is sent from a sender (e.g., a write function) to a receiver (e.g., a read function) via a storage media. As information is stored and transmitted in the form of digital data, errors are introduced that, if not corrected, can corrupt the data and render the information unusable. The effectiveness of any transfer is impacted by any losses in data caused by various factors.

Storage systems, such as disk drives, typically include one or more disks (e.g., magnetic disks or other storage media). Data is stored on the disks as a series of concentric tracks each comprising a number of data sectors. Each data sector is formatted to include a preamble, a sync mark (e.g., sync-Mark), and a data field. The storage system includes a read channel that processes the acquisition preamble to adjust the magnitude of the read signal and synchronize timing recovery in sampled amplitude read channels so that it can accurately read the data field. The sync mark demarks the beginning of the data field. A sync mark detector within the read channel detects the sync mark, and enables operation of a channel decoder to begin decoding the detected data sequence. When the sync mark detector is unable to detect the sync mark, the read channel cannot synchronize to the data field. For example, the sync mark detector could miss detecting the sync mark due to signal defects where the read-back signal on the sync mark is destroyed or distorted beyond the tolerance of the sync mark detector. When this happens, the read channel will recognize that the sync mark was not detected by the sync mark detector and initiate a retry. The storage system will wait for the disk to complete a revolution, which increases the overall access time, and again attempt to accurately detect the sync mark. When the sync mark detector cannot detect the sync mark upon retry, a channel fault can occur and data from the sector could be lost.

SUMMARY

Techniques are described for no sync mark retry to efficiently recover data that includes one or more data fragments missing a sync mark. In one or more embodiments, the techniques are implemented in a data processing apparatus, such as a read channel of a data storage system, and so forth. The data processing apparatus is configured to receive at least part of a data fragment read from a storage media into a register, wherein the data fragment is configured to be formatted with a preamble, a sync mark, and user data. Where a determination is made that the data fragment is missing a sync mark, a position in the data fragment is selected, and a sync mark is assumed at the selected position. The data is then processed assuming the sync mark is at the selected position of the data fragment to determine whether the data converges. When a determination is made that the data converges, the data is recovered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures indicate similar or identical items.

DETAILED DESCRIPTION

Figure 1A:
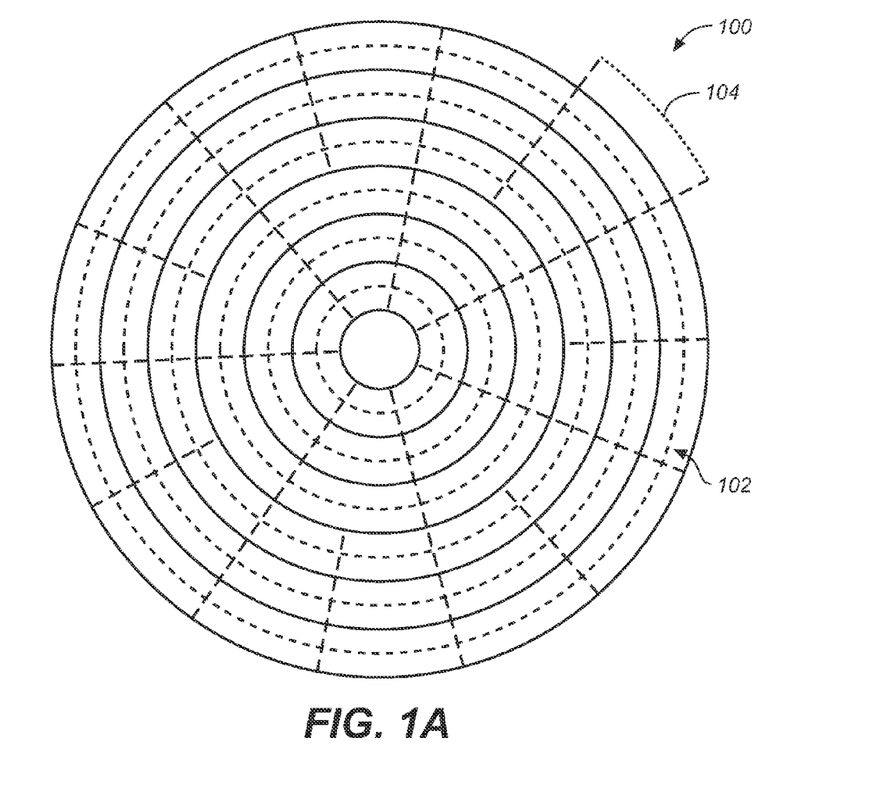
FIG. 1A is a diagrammatic illustration that depicts a data format of a magnetic disk having a plurality of concentric tracks comprised of a plurality of data sectors in accordance with an embodiment of the disclosure.
Figure 1B:
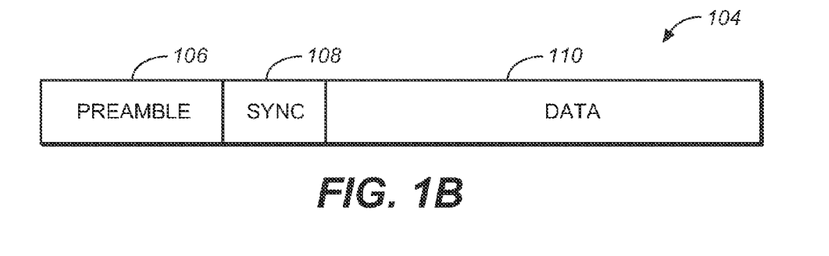
FIG. 1B is a diagrammatic illustration depicting an example format for a data sector of the magnetic disk shown in FIG. 1A.

FIGS. 1A and 1B illustrate a data format of a magnetic disk medium 100, such as a magnetic disk medium within a hard disk drive (HDD). As shown, the magnetic disk medium 100 is formatted to have a plurality of concentric tracks 102 comprised of a plurality of data sectors 104. In some embodiments, the data storage capacity at the outer tracks of the magnetic disk medium 100 is increased due to the increase in circumferential recording area (e.g., due to a decrease in intersymbol interference (ISI)). For example, in embodiments, the magnetic disk medium 100 is partitioned into two or more zones (e.g., an inner zone, an intermediate zone, an outer zone, and so forth), wherein the capacity and data rate increase from the innermost zones to the outermost zones.

As shown in FIG. 1B, each data sector 104 is formatted to include a preamble 106, a sync mark (e.g., a syncMark) 108, and a data field 110. The read channel processes the preamble 106 to acquire the correct sampling frequency and phase before reading data from the data field 110. The sync mark 108 demarks the start of the data (e.g., the beginning of the data field 110). A sync mark detector within a read channel, such as the read channel 200 of FIG. 2A through 2C, detects the sync mark 108, and enables operation of a channel decoder to begin decoding detected data within the data field 110. In embodiments, the data field 110 further includes/precedes a post amble (not shown). When the sync mark detector is unable to detect the sync mark 108, the read channel does not synchronize to the data field 110. Thus, the read channel recognizes that the sync mark detector failed to detect the sync mark 108 and initiates a retry.

Figure 2A:
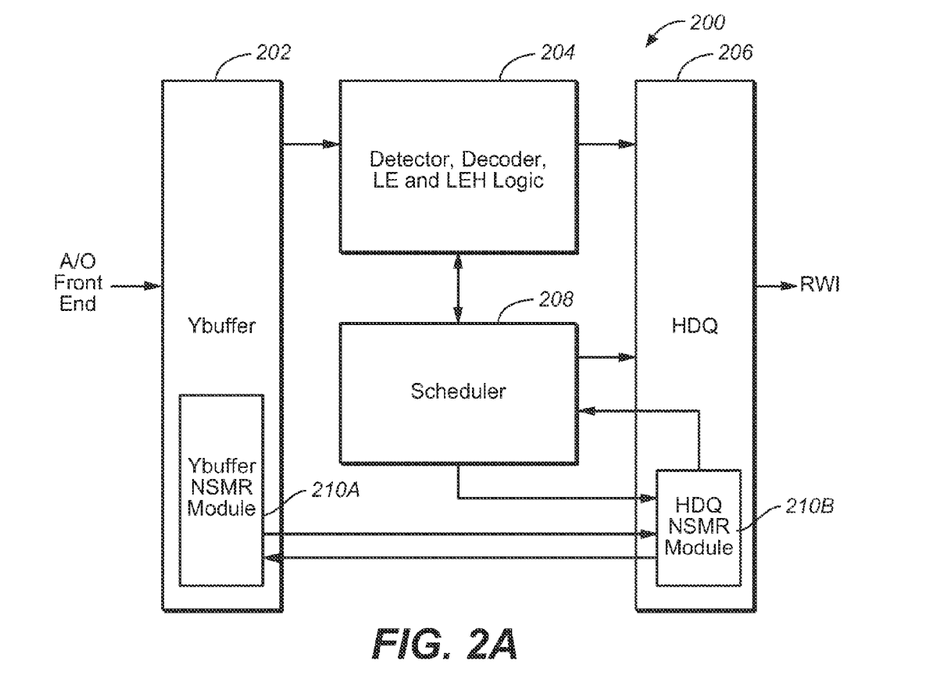
FIG. 2A is a block diagram illustrating a read channel that implements no sync mark retry (NSMR) for data recovery in accordance with an embodiment of the disclosure.
Figure 2B:
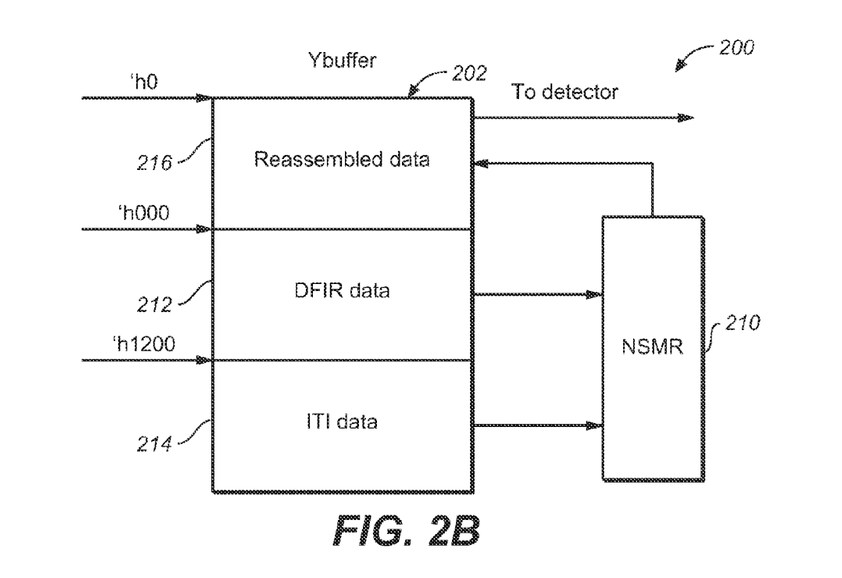
FIG. 2B is a block diagram that illustrates the Y buffer and NSMR of the read channel illustrated in FIG. 2A.
Figure 2C:
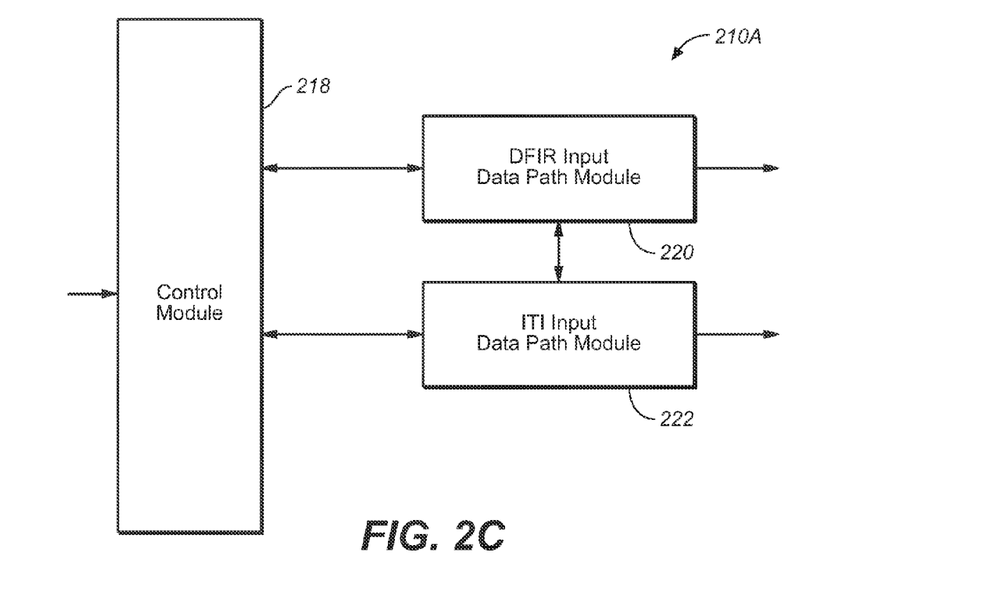
FIG. 2C is a block diagram that illustrates operation of the control module and DFIR and ITI input data path modules of the NSMR shown in FIG. 2B.

FIGS. 2A through 2C illustrate a data processing apparatus (a read channel 200 is shown by way of example) that implements no sync mark retry (NSMR) in accordance with an embodiment of the disclosure to efficiently recover data (e.g., a data sector of a magnetic disk) that includes one or more data fragments missing a sync mark. The read channel 200 is configured to receive at least part of a data fragment read from a storage medium, such as the magnetic disk medium 100 of FIGS. 1A and 1C, into a register, wherein the data fragment is configured to be formatted with a preamble, a sync mark (e.g., a syncMark), and user data, and wherein the data fragment is missing a sync mark. A position in the data fragment is selected, a sync mark is assumed at the selected position. The data is then processed assuming the sync mark is at the selected position of the data fragment to determine whether the data converges (e.g., whether the detector and decoder of the read channel converges the data). When a determination is made that the data converges, the data is recovered.

In one or more embodiments, the read channel 200 includes a Y buffer configured to receive equalized digital sample data (Y samples) derived from data read from a storage media and a hard decision queue (HDQ) configured to receive hard decision data derived from the equalized digital sample data. A no sync mark retry (NSMR) module includes a data reassembler, associated with the Y buffer, and an arbiter, associated with the hard decision queue (HDQ). The data reassembler receives at least part of a data fragment into a register, and assumes a sync mark at a selected position in the data fragment, to generate the equalized digital sample data. The equalized digital sample data is then processed (e.g., equalized, detected, filtered, decoded, and so forth). The arbiter determines whether data converges. When a determination is made that the data converges, a data processing apparatus causes the data to be recovered.

As shown in FIG. 2A, the Y buffer 202 stores equalized digital sample data (Y samples) received from an analog and digital front end. The Y buffer 202 comprises a memory (e.g., Y memory) that stores the equalized digital sample data (Y samples) to be processed by the read channel detector, decoder, LE logic, and LEH logic 204, as discussed herein below.

The analog and digital front end includes an analog front end that receives and processes an analog signal from a storage or transmission channel. In embodiments, the analog front end includes, but is not necessarily limited to: an analog filter or an amplifier circuit. For example, in embodiments, the analog front end includes a high pass filter, a variable gain amplifier (VGA), a compensation circuit for the magneto-resistive asymmetry (MRA) characteristic of a magnetic write head, and so forth. In some embodiments, the gain of a variable gain amplifier and the cutoff frequency and boost of an analog filter included in the analog front end are modifiable.

The analog and digital front end further includes an analog to digital converter (ADC) that converts the processed analog signal into a corresponding series of digital sample data or X samples. In embodiments, the analog to digital converter (ADC) comprises a circuit that is capable of producing digital sample data corresponding to an analog input signal. It will be appreciated that a variety of analog to digital converters (ADCs) are employed by various embodiments of the read channel digital front end. It is further contemplated that, in embodiments, the digital sample data (X samples) is obtained directly from a digital storage device or digital transmission storage media, without the use of an analog to digital converter (ADC). An equalizer applies an equalization algorithm to the digital sample data (X samples) to yield equalized sample data or Y samples. In embodiments, the equalizer comprises a digital finite impulse response (DFIR) filter circuit. However, other embodiments are contemplated.

In embodiments, the equalized digital sample data (Y samples) are provided to the Y buffer 202 following finite impulse response (FIR) filtering. For example, in embodiments, the analog to digital front end further includes one or more noise predictive finite impulse response (NPFIR) filters which are configured to filter noise in the equalized digital sample data (Y samples). The equalized digital sample data (Y samples) is provided to NPFIR filters by the equalizer (DFIR).

The equalized digital sample data (Y samples) stored in the Y buffer 202 are processed by the read channel detector, decoder, LE logic, and LEH logic 204 to generate hard and soft decisions that are stored in a hard decision queue (HDQ) 206. For example, in embodiments, the read channel includes a soft channel detector that performs an iterative data detection process on the filtered equalized sample data (Y samples) and generates a series of reliability information for each Y sample in the form of soft bit decisions, such as log likelihood ratio (LLR) values. The LLR values are processed by decoder, in an iterative manner, to generate the hard and soft decisions that are stored in a HDQ 206 to be furnished to a read/write interface (RWI). Generally, a hard bit decision is closely related to the detector and decoder soft output (LLR) values. Likewise, the magnitude of the detector and decoder output LLR values provides an indication of the reliability of the decision.

In embodiments, the detector comprises a maximum a posteriori (MAP) data detector. However, it is contemplated that, in embodiments, the maximum a posteriori (MAP) data detector comprises other maximum a posteriori (MAP) detection algorithm or detector circuit or variations thereof including, but not limited to: simplified maximum a posteriori (MAP) data detection algorithms and max-log maximum a posteriori (MAP) data detection algorithms, or corresponding detector circuits. In other embodiments, the detector 108 comprises a Viterbi algorithm data detector circuit, such as a Soft-Output Viterbi (SOVA) algorithm data detector circuit. However, it is contemplated that, in embodiments, the Viterbi algorithm data detector circuit comprises other Viterbi detection algorithm or Viterbi algorithm detector circuit or variations thereof including, but not limited to: bi-direction Viterbi detection algorithms or bi-direction Viterbi algorithm detector circuits. Similarly, in various embodiments, the decoder comprises binary or no-binary, layered or non-layered decoder circuits. In embodiments, the decoder comprises a low density parity check (LDPC) decoder circuit. In some embodiments, the detected output is also interleaved in a local interleaver circuit to shuffle sub-portions (i.e., local chunks) of the data set included as detector output, and stored in a central memory (not shown).

In embodiments, the data detection/decoding process involves multiple stages of detection and decoding, as described above, to cause the data to converge. For example, in embodiments, the decoder employs local iterations. In embodiments, the decoder and the detector further employs global iterations if the decoding does not converge within the decoder local iterations. For each global iteration, the decoder soft decisions (LLRs) are sent to the detector for further detection. Operation of the read channel 200 (e.g., transfer of sample data between the Y buffer 202, detector, decoder, LE and LEH logic 204, and HDQ 206) is controlled by the scheduler 208.

The read channel 200 is illustrated as including a no sync mark retry (NSMR) module 210 to recover data (e.g., a data sector of a magnetic disk) that includes one or more data fragments missing a sync mark in accordance with an embodiment of the disclosure. As noted, when the sync mark detector of the read channel 200 is unable to detect the sync mark 108 of a data fragment within a sector of data, the read channel does not synchronize to the data field 110 to generate correct digital sample data (X and/or Y samples). The read channel recognizes that the sync mark detector failed to detect the sync mark 108 and initiate a retry to recover the data by executing the NSMR module 210 (e.g., the NSMR module 210 is executed upon receiving the determination from the sync mark detector that the data fragment was not found within the data fragment 104).

In the embodiment shown, the NSMR module 210 includes a Y buffer NSMR module 210A, associated with the Y buffer 202, and an HDQ NSMR module 210B, associated with the HDQ 206. The Y buffer NSMR module 210A comprises a data reassembler that receives at least part of a data fragment missing a sync mark into a register. The Y buffer NSMR module 210 then assumes a sync mark at a selected position in the data fragment, and causes equalized digital sample data (Y samples) to be generated as discussed above. The equalized digital sample data (Y samples) is then processed (e.g., detected, filtered, decoded, and so forth) by the detector, decoder, LE and LEH logic 204.

It is contemplated that, in embodiments, the NSMR module 210 employs multiple registers to recover data having data fragments missing multiple data fragments. For example, in one specific embodiment, the NSMR module 210 employs two (2) defined sets of registers, and thus is capable of recovering a sector with up to two data fragments missing sync marks.

As shown in FIG. 2A, the HDQ NSMR module 210B comprises an arbiter that determines (e.g., detects) whether the data converges (e.g., whether the detector and decoder of the read channel converges the data as discussed above). When a determination is made that the data does not converge, the HDQ NSMR module 210B causes the unconverged solution (e.g., unconverged hard and soft decisions) stored in a HDQ 206 to be removed from the HDQ 206. The HDQ NSMR module 210B communicates with the Y buffer NSMR module 210A and scheduler 208 to cause a new solution (e.g., new hard and soft decisions) to be generated.

In response, the Y buffer NSMR module 210A assumes a sync mark at a new selected position in the data fragment, and causes new equalized digital sample data (Y samples) to be generated and stored in the Y buffer 202. The scheduler 208 then causes the new equalized digital sample data (Y samples) to be processed (e.g., detected, filtered, decoded, and so forth) by the detector, decoder, LE and LEH logic 204, as discussed above. In embodiments, this process is repeated until the HDQ NSMR module 210B determines (e.g., detects) that the data has converged (e.g., whether the detector and decoder of the read channel has converged the data as discussed above), or until a determination is made that there are no further positions within the data fragment that capable of containing the sync mark, which cause the data to converge.

During retry, the HDQ NSMR module 210B further controls NSMR protocol between the HDQ 206 and the read/write interface (RWI) (not shown). For example, in embodiments, the RWI requests a current solution (e.g., current hard and soft decisions) from the HDQ 206, the next solution (e.g., next hard and soft decisions) from the HDQ 206, and so forth. For example, in embodiments, the HDQ NSMR module 210B causes the HDQ 206 to delay providing a solution (e.g., hard and soft decisions) until a converged solution is found, and the data is recovered.

In one or more embodiments, the NSMR module 210 is configured to operate in a capture phase and a calculation phase. As shown in FIGS. 2B and 2C, during the capture phase, the NSMR module 210 causes equalized digital sample data (Y samples) from an equalizer (DFIR) of the read channel 200 (DFIR data 212) to be loaded into the Y buffer 202 at a Y buffer address (e.g., in FIG. 2B, the DFIR data 212 is illustrated as being stored at Y buffer address 'h600). Similarly, during the capture phase, the NSMR module 210 causes corresponding equalized digital sample data (Y samples) from a detector 204 of the read channel 200 (ITI data 214) to be stored into the Y buffer 202 at a second Y buffer address (e.g., in FIG. 2B, the ITI data 214 is illustrated as being stored at Y buffer address 'h1200). For example, in the embodiment shown in FIG. 2C, the Y buffer NSMR module 210A includes a control module 218 and data path modules, DFIR input data path module 220 and ITI input data path module 222, for receiving the DFIR data 212 and ITI data 214, respectively, and storing the data to the Y buffer 202.

During the calculation phase, NSMR nodule 210 (e.g., the control module 218 of the Y buffer NSMR module 210A) selects DFIR data 212 for data fragments that are missing a sync mark. The NSMR module 210 further selects ITI data 214 for corresponding data fragments having a sync mark. The NSMR module 210 then reassembles the DFIR data 212 and ITI data 214, and stores the reassembled equalized digital sample data for the sector (Reassembled data 216) at a third Y buffer address (e.g., in FIG. 2B, the Reassembled data 216 is illustrated as being stored at Y buffer address 'h0). The Reassembled data 216 is then processed (e.g., detected, filtered, decoded, and so forth) by the detector, decoder, LE and LEH logic 204, and the generated hard and soft decisions stored in a HDQ 206.

As noted, the NSMR module 210 receives at least part of a data fragment missing a sync mark into a register. The register defines a no sync mark retry (NSMR) searching window, in which the NSMR module 210 searches for a position in which the missing sync mark is located that are capable of containing the sync mark, which cause the data to converge. In embodiments, the NSMR searching window is defined by a start position of the NSMR searching window within the data fragment and a length of the NSMR searching window. Thus, the NSMR searching window is defined to include a number of positions (e.g., bits, groups of bits, and so forth) within the data fragment.

Figure 3:
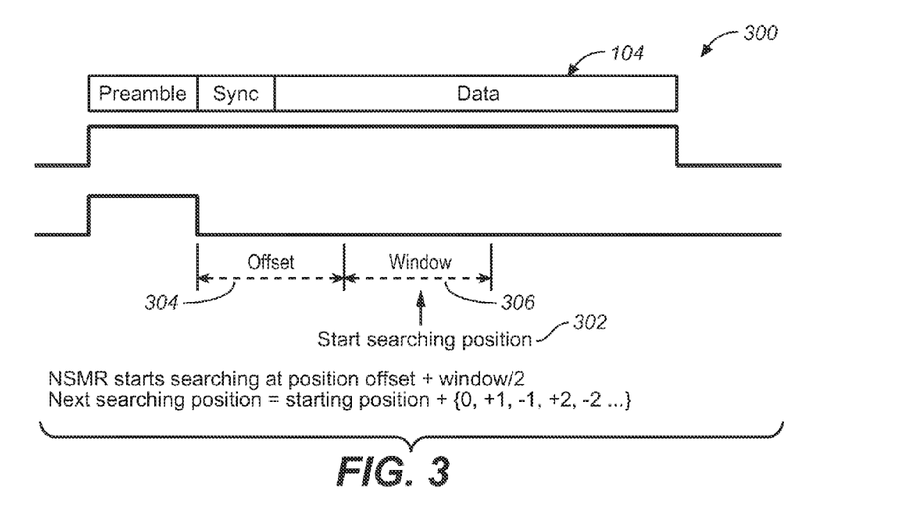
FIG. 3 is a diagrammatic illustration depicting the embodiment of a no sync mark retry (NSMR) searching window to a data fragment to select positions within the data fragment as assumed positions of the missing sync mark.

FIG. 3 illustrates the embodiment of a NSMR searching window 300 to a data fragment to select positions within the data fragment as assumed positions of the missing sync mark. The NSMR module 210 (FIG. 2B) stores DFIR data 212, while the NSMR module 210 is in the capture phase. During calculation phase, the NSMR module 210 (e.g., the control module 218 of the Y buffer NSMR module 210A) assumes that the sync mark is located at a start searching position 302 within NSMR searching window 300 for the data fragment 104. If, following processing of the equalized digital sample data (Y samples), the data does not converge, the NSMR module 210 (e.g., the control module 218 of the Y buffer NSMR module 210A) selects a new position within the NSMR searching window 300. For example, in embodiments, the NSMR module 210 increments or decrements the selected position by one position (e.g., by one bit, by one group of bits, and so forth) during each iteration, to select the new position.

In the embodiment shown in FIG. 3, the start searching position 302 is determined as the position corresponding to the sum of an offset 304 for the data fragment 104 added to one-half of the window length 106 for the data fragment 104 (Start Searching Position=Offset+Window/2). The upper bound 308 of the NSMR searching window 300 is defined as one position less than the sum of the offset 304 added to the window length 306 (Upper Bound=Offset+Window−1), while the lower bound 310 of the NSMR searching window 300 is defined as the offset 304 (Offset).

Figure 4:
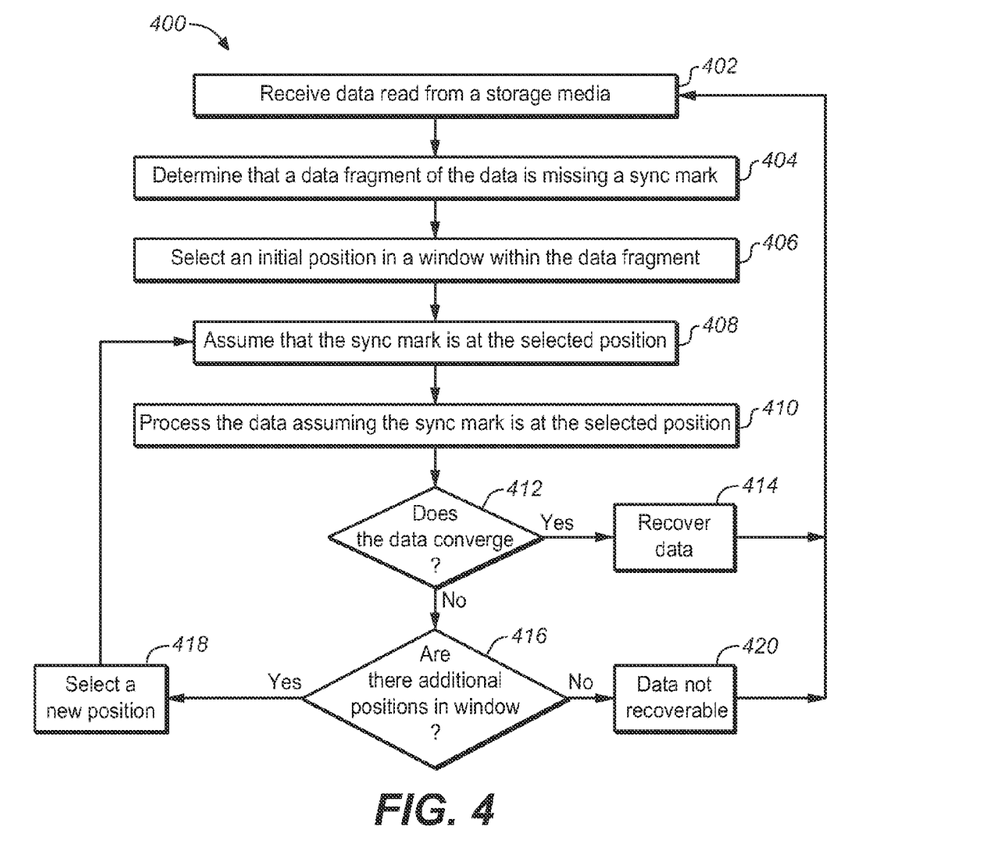
FIG. 4 is a flow diagram that illustrates a method, in an embodiment, that is employed by a data processing apparatus, such as the read channel shown in FIG. 1, to recover data from a data fragment missing a sync mark.

FIG. 4 illustrates a method 400 in an embodiment of the disclosure that is employed by an adaptive MAP detector, such as the adaptive MAP detector of the read channel front end shown in FIG. 1, to furnish equalizer adaptation. As shown, data read from a storage media is received (Block 402). For example, as shown in FIGS. 2A through 2C, the read channel 200 includes a Y buffer 202 that stores equalized digital sample data (Y samples) received from an analog and digital front end of the read channel 200, which is derived from data read from the storage media (e.g., a magnetic disk).

A determination is made that a data fragment of the data is missing a sync mark (Block 404). For example, as described in the discussion of FIGS. 2A through 2C, when the sync mark detector of the read channel 200 is unable to detect the sync mark 108 of a data fragment within a sector of data, the read channel does not synchronize to the data field 110 to generate correct digital sample data (X and/or Y samples). The read channel recognizes that the sync mark detector failed to detect the sync mark 108 and initiate a retry to recover the data by executing the NSMR module 210 (e.g., the NSMR module 210 is executed upon receiving the determination from the sync mark detector that the data fragment was not found within the data fragment 104).

An initial position in a NSMR searching window within the data fragment is then selected (Block 406). The sync mark is assumed to be at the selected position (Block 408). For example, as shown in FIG. 3, the NSMR module 210 (e.g., the control module 218 of the Y buffer NSMR module 210A) assumes that the sync mark is located at a start searching position 302 within NSMR searching window 300 for the data fragment 104. In embodiments, the start searching position 302 is determined as the position corresponding to the sum of an offset 304 for the data fragment 104 added to one-half of the window length 106 for the data fragment 104 (Start Searching Position=Offset+Window/2).

The data is then processed assuming the sync mark is at the selected initial position in the data fragment (Block 410). For example, as shown in FIG. 2A, the equalized digital sample data (Y samples) stored in the Y buffer 202 are processed by the read channel detector, decoder, LE logic, and LEH logic 204 to generate hard and soft decisions that are stored in a hard decision queue (HDQ) 206.

A determination is then made whether the data converges (Decision Block 412). For example, as shown in FIG. 2A, the HDQ NSMR module 210B determines (e.g., detects) whether the data converges (e.g., whether the detector and decoder of the read channel converges the data). When a determination is made that the data converges ("Yes" at Decision Block 412), the data is recovered (Block 414) and the data is read and processed normally. In embodiments, additional data is then received from the storage media (Block 402), and process 400 repeated.

When, however, a determination is made that the data does not converge ("No" at Decision Block 412), a second determination is made whether there are additional positions in the window (Decision Block 416) within the data fragment. For example, as discussed above, the NSMR module 210 of FIGS. 2A through 2C receives at least part of a data fragment missing a sync mark into a register. In embodiments, the register defines a NSMR searching window, in which the NSMR module 210 searches for a position capable of containing the sync mark (e.g., in which the missing sync mark could be located), which causes the data to converge. As noted, in embodiments, the NSMR searching window is defined by a start position of the NSMR searching window within the data fragment and a length of the NSMR searching window. Thus, the NSMR searching window is defined to include a number of positions (e.g., bits, groups of bits, and so forth) within the data fragment.

When a determination is made that there are additional positions in the NSMR searching window ("Yes" at Decision Block 416), a new position within the NSMR searching window within the data fragment is then selected (Block 418). The sync mark is assumed to be at the selected new position (Block 408). For example, as shown in FIG. 2A, the HDQ NSMR module 210B causes the unconverged solution (e.g., unconverged hard and soft decisions) stored in a HDQ 206 to be removed from the HDQ 206. The HDQ NSMR module 210B communicates with the Y buffer NSMR module 210A and scheduler 208 to cause a new solution (e.g., new hard and soft decisions) to be generated.

The data is again processed assuming the sync mark is at the selected initial position in the data fragment (Block 410). This process (Blocks 408-418) is repeated until a determination is made that the data converges ("Yes" at Decision Block 412), or until a determination is made that there are no additional positions in the window within the data fragment ("No" at Decision Block 416).

When a determination is made that there are no additional positions in the NSMR searching window within the data fragment ("No" at Decision Block 416), the data fragment is determined to not be recoverable (Block 420). In embodiments, a channel fault is registered. In embodiments, additional data is received from the storage media (Block 402), and process 400 repeated, even though the instantly processed data fragment is not recoverable and/or a channel fault is registered.

Figure 5:
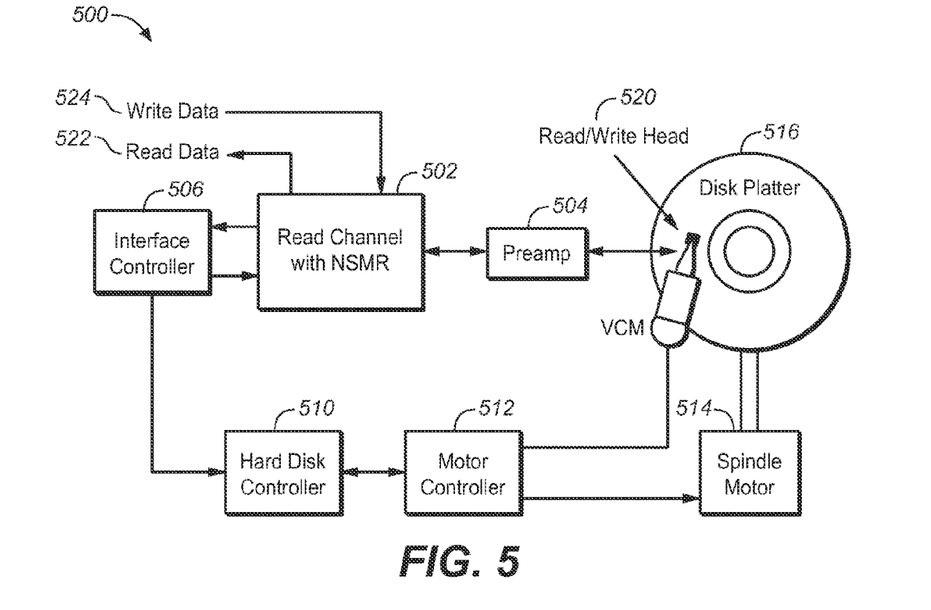
FIG. 5 is a block diagram that illustrates a storage system having a read channel that employs NSMR for data recovery in accordance with an embodiment of the disclosure.
Figure 6:
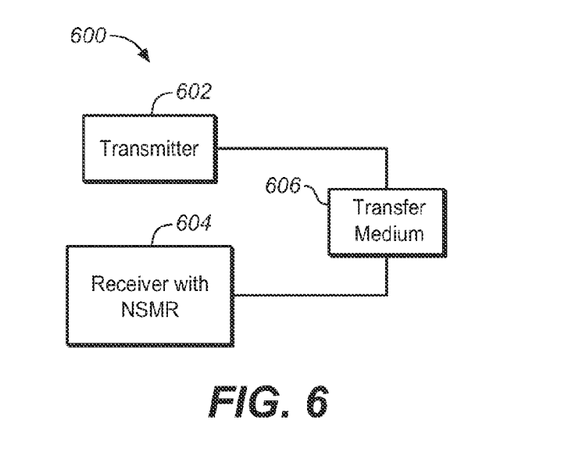
FIG. 6 is a block diagram that illustrates a wireless communication system having a receiver that employs NSMR for data recovery in accordance with an embodiment of the disclosure.

Although the NSMR 210 disclosed herein is not limited to any particular application, several examples of applications are presented in FIGS. 5 and 6. In FIG. 5, a storage system 500 is illustrated. The storage system 500 includes a read channel circuit 502 that employs an NSMR in accordance with an embodiment of the disclosure, such as the NSMR 210 of the read channel 200 shown in FIGS. 2A, 2B and 2C. In embodiments, the storage system 500 comprises a hard disk drive (HDD). As shown, the storage system 500 includes a preamplifier 504, an interface controller 506, a hard disk controller 510, a motor controller 512, a spindle motor 514, a disk platter 516, and a read/write head assembly 520. The interface controller 506 controls addressing and timing of data to/from the disk platter 516. The data on the disk platter 516 includes groups of magnetic signals that are detected by the read/write head assembly 520 when the assembly is properly positioned over disk platter 516. In one or more embodiments, the disk platter 516 includes magnetic signals recorded in accordance with either a longitudinal or a perpendicular recording scheme.

In a typical read operation, the read/write head assembly 520 is accurately positioned by the motor controller 512 over a desired data track on the disk platter 516. The motor controller 512 positions the read/write head assembly 520 in relation to the disk platter 516 and drives the spindle motor 514 by moving the read/write head assembly 520 to the proper data track on the disk platter 516 under the direction of the hard disk controller 510. The spindle motor 514 spins the disk platter 516 at a determined spin rate (e.g., at a determined number of revolutions per minute (RPM)). Once the read/write head assembly 520 is positioned adjacent the proper data track, magnetic signals representing data on the disk platter 516 are sensed by the read/write head assembly 520 as the disk platter 516 is rotated by the spindle motor 514. The sensed magnetic signals are provided as a continuous, minute analog signal representative of the magnetic data on the disk platter 516. This minute analog signal is transferred from the read/write head assembly 520 to the read channel circuit 502 via a preamplifier 504. The preamplifier 504 is operable to amplify the minute analog signals accessed from the disk platter 516. In turn, the read channel 502 decodes and digitizes the received analog signal to recreate the information originally written to the disk platter 516. This data is provided as read data 522 to a receiving circuit. As part of decoding the received information, the read channel 502 processes the received signal using the NSMR 102 as described herein. A write operation is substantially the opposite of the preceding read operation with write data 524 being provided to the read channel 502. This data is then encoded and written to the disk platter 516.

It should be noted that, in embodiments, the storage system 500 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments, data is mirrored to multiple disks in the RAID storage system, or sliced and distributed across multiple disks using a number of techniques. If a small number of disks in the RAID storage system fail or become unavailable, error correction techniques are used to recreate the missing data based on the remaining portions of the data from the other disks in the RAID storage system. In embodiments, the disks in the RAID storage system include, but are not limited to: individual storage systems such as storage system 500, and are located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

FIG. 6 illustrates a wireless communication system 600 or data transmission device including a receiver 604 that employs an NSMR in accordance with an embodiment of the disclosure, such as the NSMR 210 shown in FIGS. 2A, 2B, and 2C. The communication system 600 includes a transmitter 602 that is operable to transmit encoded information via a transfer storage media 606. The encoded data is received from the transfer storage media 606 by receiver 604. As part of the processing of the encoded data, the receiver 604 processes the received signal (e.g., when one or more data fragments missing sync marks are detected) using an NSMR 210 as described herein.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the case of a hardware embodiment, for example, the various blocks discussed in the above disclosure can be implemented as integrated circuits along with other functionality. In embodiments, such integrated circuits include all of the functions of a given block, system or circuit, or a portion of the functions of the block, system or circuit. Further, in embodiments, elements of the blocks, systems or circuits are implemented across multiple integrated circuits. Such integrated circuits include any type of integrated circuit including, but not necessarily limited to: a monolithic integrated circuit, a flip chip integrated circuit, a multichip module integrated circuit, and/or a mixed signal integrated circuit. In the case of a software embodiment, for example, the various blocks discussed in the above disclosure represent executable instructions (e.g., program code) that perform specified tasks when executed on a processor. In embodiments, these executable instructions are stored in one or more tangible computer readable media. In some such embodiments, the entire system, block or circuit is implemented using its software or firmware equivalent. In other embodiments, one part of a given system, block or circuit is implemented in software or firmware, while other parts are implemented in hardware.

Although the subject matter has been described in language specific to structural features and/or methodological acts, it is to be understood that the subject matter defined in the appended claims is not necessarily limited to the specific features or acts described. Although various configurations are discussed the apparatus, systems, subsystems, components and so forth can be constructed in a variety of ways without departing from this disclosure. Rather, the specific features and acts are disclosed as example forms of implementing the claims.

What is claimed is:

1. A method comprising:
receiving at least part of a data fragment read from a storage media into a register, the data fragment configured to be formatted with a preamble, a sync mark, and user data, wherein the data fragment is missing a sync mark;
selecting a position in the data fragment;
assuming that a sync mark is at the selected position;
processing the data assuming the sync mark is at the selected position of the data fragment to determine whether the data converges; and
when a determination is made that the data converges, causing the data to be recovered.

2. The method as recited in claim 1, further comprising
when a determination is made that the data does not converge, selecting a new position in the data fragment and assuming that the sync mark is at the selected new position; and
processing the data assuming the sync mark is at the selected new position to determine whether the data converges.

3. The method as recited in claim 1, wherein the position and the new position are selected within a no sync mark retry (NSMR) searching window defining positions within the data fragment that are capable of including a sync mark.

4. The method as recited in claim 3, wherein the no sync mark retry (NSMR) searching window is defined by a start position within the data fragment and a length.

5. The method as recited in claim 4, further comprising receiving a determination that the data fragment is missing the sync mark.

6. The method as recited in claim 1, wherein the data fragment comprises at least part of a sector of a magnetic disk storage media.

7. A data processing apparatus, comprising:
- a Y buffer configured to receive equalized digital sample data derived from data read from a storage media, the data including one or more data fragments formatted to comprise a preamble, a sync mark, and user data, wherein a data fragment of the data is missing a sync mark;
- a hard decision queue (HDQ) configured to receive decision data derived from the equalized digital sample data; and
- a no sync mark retry (NSMR) module comprising:
- a data reassembler associated with the Y buffer, the data reassembler configured to receive at least part of a data fragment into a register, and to assume a sync mark at a selected position in the data fragment to generate the equalized digital sample data; and
- an arbiter associated with the hard decision queue (HDQ), the arbiter configured to determine whether the equalized digital sample data converges, wherein when a determination is made that the equalized sample data converges, the data read from the storage media is recovered.

8. The data processing apparatus as recited in claim 7, wherein when the arbiter determines that the equalized digital data does not converge, the data reassembler is configured to select a new position in the data fragment, wherein the sync mark is assumed at the selected new position.

9. The data processing apparatus as recited in claim 8, wherein the position and the new position is selected within a no sync mark retry (NSMR) searching window defining positions within the data fragment that are capable of containing a sync mark.

10. The data processing apparatus as recited in claim 9, wherein the no sync mark retry (NSMR) searching window is defined by a start position within the data fragment and a length.

11. The data processing apparatus as recited in claim 10, wherein the no sync mark retry (NSMR) module is configured to receive a determination that the data fragment is missing a sync mark.

12. The data processing apparatus as recited in claim 11, wherein the no sync mark retry (NSMR) module is configured to cause equalized digital sample data from an equalizer and corresponding equalized digital sample data from a detector to be stored into the Y buffer, the no sync mark retry (NSMR) module operable to search the equalized digital sample data from the equalizer for a data fragment missing a sync mark and to search the equalized digital sample data from the decoder for a corresponding data fragment having a sync mark, and to store reassembled equalized digital sample data derived from the equalized digital sample data from the equalizer and the equalized digital sample data from the decoder to the Y buffer for decoding.

13. The data processing apparatus as recited in claim 7, wherein the data fragment comprises at least part of a sector of a magnetic disk storage media.

14. A storage system, comprising:
- a storage media configured to store data, the data including one or more data fragments formatted to comprise a preamble, a sync mark, and user data;
- a read/write assembly operable to read the data on the storage media; and
- a read channel operable to:
- generate equalized digital sample data derived from data read from a storage media, wherein a data fragment of the data is missing a sync mark;
- select a position in the data fragment;
- assume that a sync mark is at the selected position;
- process the data assuming the sync mark is at the selected position of the data fragment to determine whether the data converges; and
- when a determination is made that the data converges, recovering the data fragment.

15. The storage system as recited in claim 14, wherein the read channel comprises:
- a Y buffer configured to receive the equalized digital sample data;
- a hard decision queue configured to receive decision data derived from the equalized digital sample data; and
- a no sync mark retry (NSMR) module comprising:
- a data reassembler configured to receive the at least part of a data fragment into the register and assume the sync mark is at the selected position; and
- an arbiter configured to determine whether data processed assuming the sync mark is at the selected position of the data fragment converges.

16. The storage system as recited in claim 15, wherein when the arbiter determines that the data does not converge, the data reassembler selects a new position in the data fragment, wherein the sync mark is assumed at the selected new position.

17. The storage system as recited in claim 16, wherein the position and the new position is selected within a no sync mark retry (NSMR) searching window defining positions within the data fragment that are capable of being selected.

18. The storage system as recited in claim 17, wherein the no sync mark retry (NSMR) searching window is defined by a start position within the data fragment and a length.

19. The storage system as recited in claim 14, wherein the sync mark retry (NSMR) module is configured to receive a determination that the data fragment is missing a sync mark.

20. The storage system as recited in claim 14, wherein the no sync mark retry (NSMR) module is configured to cause equalized digital sample data from an equalizer and corresponding equalized digital sample data from a detector to be stored into the Y buffer, the no sync mark retry (NSMR) module operable to search the equalized digital sample data from the equalizer for a data fragment missing a sync mark and to search the equalized digital sample data from the decoder for a corresponding data fragment having a sync mark, and to store reassembled equalized digital sample data derived from the equalized digital sample data from the equalizer and the equalized digital sample data from the decoder to the Y buffer for decoding.

\* \* \* \* \*